(12) United States Patent
Yadav et al.

(10) Patent No.: US 10,394,627 B2
(45) Date of Patent: Aug. 27, 2019

(54) ASYNCHRONOUS C#-JS DATA BINDING BRIDGE

(71) Applicant: SCHNEIDER ELECTRIC SOFTWARE, LLC, Lake Forest, CA (US)

(72) Inventors: Lokesh Yadav, Bangalore (IN); Shishir Roy, Bangalore (IN); Chetankumar Patel, Bangalore (IN)

( * ) Notice: Subject to any disclaimer, the term of this patent is extended or adjusted under 35 U.S.C. 154(b) by 0 days.

(21) Appl. No.: 15/857,026

(22) Filed: Dec. 28, 2017

(65) Prior Publication Data

US 2019/0205103 A1    Jul. 4, 2019

(51) Int. Cl.
| | | |
|---|---|---|
| G06F 9/44 | (2018.01) | |
| G06F 9/54 | (2006.01) | |
| G06F 8/35 | (2018.01) | |
| G06F 8/38 | (2018.01) | |
| H04L 29/08 | (2006.01) | |

(52) U.S. Cl.
CPC ............... *G06F 9/542* (2013.01); *G06F 8/35* (2013.01); *G06F 8/38* (2013.01); *G06F 9/546* (2013.01); *G06F 9/547* (2013.01); *H04L 67/02* (2013.01)

(58) Field of Classification Search
CPC ........ G06F 17/3089; G06F 8/38; G06F 21/54; G06F 17/3056; G06F 17/30861; G06F 17/30572; G06F 9/542; G06F 8/35
See application file for complete search history.

(56) References Cited

U.S. PATENT DOCUMENTS

| | | | | |
|---|---|---|---|---|
| 2004/0039742 A1* | 2/2004 | Barsness | ............. | G06F 17/3056 |
| 2005/0022163 A1* | 1/2005 | Brendle | .............. | G06F 17/3089 717/116 |
| 2006/0095576 A1* | 5/2006 | Perry | ................. | G06F 17/30861 709/227 |
| 2006/0212842 A1* | 9/2006 | Gossman | .................. | G06F 8/38 717/106 |
| 2007/0074169 A1* | 3/2007 | Chess | ...................... | G06F 21/54 717/126 |
| 2007/0288890 A1* | 12/2007 | Wells | ........................ | G06F 8/38 717/113 |
| 2013/0246977 A1* | 9/2013 | Jensen | .............. | G06F 17/30572 715/854 |

* cited by examiner

*Primary Examiner* — Tuan A Vu
(74) *Attorney, Agent, or Firm* — Locke Lord LLP

(57) ABSTRACT

A method and system provides for asynchronous two-way binding between a user interface and a data model which are implemented on different frameworks. The system includes data, data model, and bridge controllers. The data controller provides a front-end binding framework that interacts with a user interface of a user device to manage a bindable property or method for a view on the user device. The data model controller provides a back-end binding framework that manages a data model, the front-end binding framework and the back-end binding framework being different types of frameworks. The bridge controller implements asynchronous two-way binding for the bindable property or method between the front-end binding framework and the back-end binding framework to update the bindable property or method in the data model when data changes at the user interface and to update the view on the user device when data changes at the data model.

20 Claims, 7 Drawing Sheets

Request Protocol Definition bindingType: Property and Method
verb: GET and PUT
membername: Method Name
value: Member Value
memberparameter: Method Parameter's Value for Setter
peerid: Peer Object Identifier

Response Protocol Definition id: Peer Object Identifier
membername: Method Name
value: Member value

Request Format

700

{
"bindingType": bindingType,
"verb": verb, "membername":
membername,
"value": value,
"memberparameter": "memberparameter",
"peerid": peerid
}

FIG. 7

Response Format

800

{
"id": id,
"membername": membername,
"value": value
}

FIG. 8

Supported Bindable Data Types

900

- Nullable
- Bool
- Number
- String
- String Array
- Complex Type
  as JSON String
- Item List Array

← Device

Device Name: XXXXXX-XXXXXX-XXX

← Sync Server

Sync Server: localhost

Port Number: XXXX

Skip | Continue

App Name

Base: Inventory

User: admin

Role: Everyone

Password: XXXX

Continue

ASYNCHRONOUS C#-JS DATA BINDING BRIDGE

FIELD

The present disclosure is related to a multi-platform bridging method and system for data and method binding across a front end and a backend implemented on different platforms, such as a Java Script framework and a C-sharp (C#) framework.

BACKGROUND

Data binding in applications (also referred to as "apps") involve automatic synchronization of data between model and view components. When data in the model changes, the view reflects the change; and when data in the view changes, the model is updated as well in an asynchronous fashion. This process occurs immediately and automatically, which ensures that the model and the view are updated at all times.

SUMMARY

There is presently no mechanism to support two-way binding in a multi-platform environment, such as with Xamarin-based hybrid multi-platform apps, in which the front-end and the back-end are implemented on different frameworks. To address these and other issues, a hybrid multi-platform binding bridge is provided, which employs a bridge controller to facilitate asynchronous two-way communications between a front-end binding framework which interacts with the user interface (UI) of a user device and a back-end binding framework which interacts with a data model (e.g., View Model or Model). In this way, the bridge controller can pass along a binding request with request data for a bindable property or/method from the UI via the front-end binding framework to the back-end binding framework for implementation on the data model, and can pass along a data response from the data model for the bindable property or method from the back-end binding framework to the front-end binding framework to update the view component and UI of the user device.

The binding bridge can help in the rapid development or design of multi-platform apps developed with Model-View-ViewModel (MVVM) architecture pattern between the HTML/JavaScript User Interface (UI) and the C# View-Model (e.g., with Xamarin C#, HTML, and JavaScript), and can leverage on the platform-specific infrastructure for fast code execution and improved data binding performance in standalone or offline apps.

In an example embodiment, a computer-implemented method and system involves providing a front-end binding framework having a data controller that interacts with a user interface of a user device to manage a bindable property or method for a view on the user device; providing a back-end binding framework with a data model controller that manages a data model, the front-end binding framework and the back-end binding framework being different types of frameworks; and implementing, via a bridge controller, asynchronous two-way binding for the bindable property or method between the data controller of the front-end binding framework and the back-end binding framework to update the bindable property or method in the data model when data changes at the user interface and to update the view on the user device when data changes at the data model. The front-end binding framework can be a Javascript binding framework, and the back-end binding framework can be a C# binding framework.

The computer-implemented method and system can further involve receiving at the front-end binding framework a binding request with request data for the binding property or method from the user interface. The implementing operation can include obtaining asynchronously a post message corresponding to the binding request from the data controller. The post message can include at least a peer identifier, a binding type and a verb associated with the binding request. The implementing operation can further include parsing the post message; and dispatching a bridge request (e.g., a request from the bridge controller) based on the parsed post message to the data model controller to perform an implementation on the data model according to at least the binding type and the verb.

The computer-implemented method and system can further involve generating a request object for the binding request in the front-end binding framework; placing the request object onto a callback queue in the front-end binding framework; and generating the post message for the request object in the front-end binding framework. The request object can include at least a peer identifier, a binding type and a verb associated with the binding request;

In a further example, the implementing operation can further involve receiving a data model response (e.g., a response from the data model) in reply to the bridge request; parsing the data model response at the bridge controller; and sending a bridge response with data from the data model based on the parsed data model response to the front-end binding framework. The data model response can include a peer identifier and a value associated with a binding property or method from the data model.

Furthermore, the computer-implemented method and system can also involve accessing the callback queue to identify the request object corresponding to the data model response according to the peer identifier; and invoking a callback function for the request object to update the view of the user interface via the bridge response with the data from the data model in response to the binding request.

DESCRIPTION OF THE FIGURES

The description of the various example embodiments is explained in conjunction with the appended drawings, in which:

FIG. 5 illustrates an example Request Protocol Definition, in accordance with an example embodiment of the present disclosure.

FIG. 6 illustrates an example Response Protocol Definition, in accordance with an example embodiment of the present disclosure.

FIG. 7 illustrates an example Request Format, in accordance with an example embodiment of the present disclosure.

FIG. 8 illustrates an example Response Format, in accordance with an example embodiment of the present disclosure.

FIG. 9 illustrates an example Supported Bindable Data Types, in accordance with an example embodiment of the present disclosure.

FIGS. 10 through 12 illustrate example pages or screens of a user interface, which allows a user to set up or configure an app for two-way binding on a computer device.

DISCUSSION OF EXAMPLE EMBODIMENTS

A system and method are provided to facilitate binding, such as data and/or method binding, using a binding bridge in a multi-platform environment, which employs a different framework for a front-end and a back-end. In an example, the front-end framework can be implemented using Javascript (JS), and the back-end framework can be implemented using C# (also referred to as C-sharp), or vice-a-versa. The front-end framework includes a front-end data binding framework with a data controller, which interacts with a user interface (UI) of a user device, e.g., via HTML, through a front-end application to provide view(s) and updates thereof on the UI. The back-end framework includes a back-end data binding framework with a data model controller to manage and update a data model (e.g., a View Model or Model). A binding bridge, implemented via a bridge controller, provides two-way communications and binding, such as data and/or method binding, in an asynchronous fashion between the front end (e.g., JS/HTML front-end) and the back-end (e.g., C# back-end).

The bridge controller is in communication with the front-end binding framework and the back-end binding framework. In this way, the binding bridge can provide an asynchronous communication layer, for example, between two different binding frameworks, such as C# and JS, and to create a portable binding layer, for example, between an HTML/JS front-end and a C# back-end. Thus, the bridge controller allows direct communication between the HTML/JS front-end and the C# back-end to achieve asynchronous two-way data binding. The binding bridge can, for example, be configured to inject multiple data types (e.g., JS (Java.lang) object) across C#-JS layers and queue messages in Android; to trap messages from JS in IWKScriptMessage handler for iOS; and to perform WinRT component queuing in Windows 10. An example of the binding bridge and its general operations will be described below in greater detail with reference to the figures.

The binding bridge can assist in the rapid development or design of multi-platform apps developed with Model-View-ViewModel (MVVM) architecture pattern or other View-Model architecture patterns between the HTML/JavaScript (UI) user interface and the C# ViewModel (e.g., with Xamarin C#, HTML, and JavaScript), and can leverage on the platform-specific infrastructure for fast code execution and improved data binding performance in standalone or offline apps. Furthermore, the asynchronous nature of the two-way binding infrastructure frees the UI to perform other tasks while the binding request is pending.

I. Architecture

Figure 1:
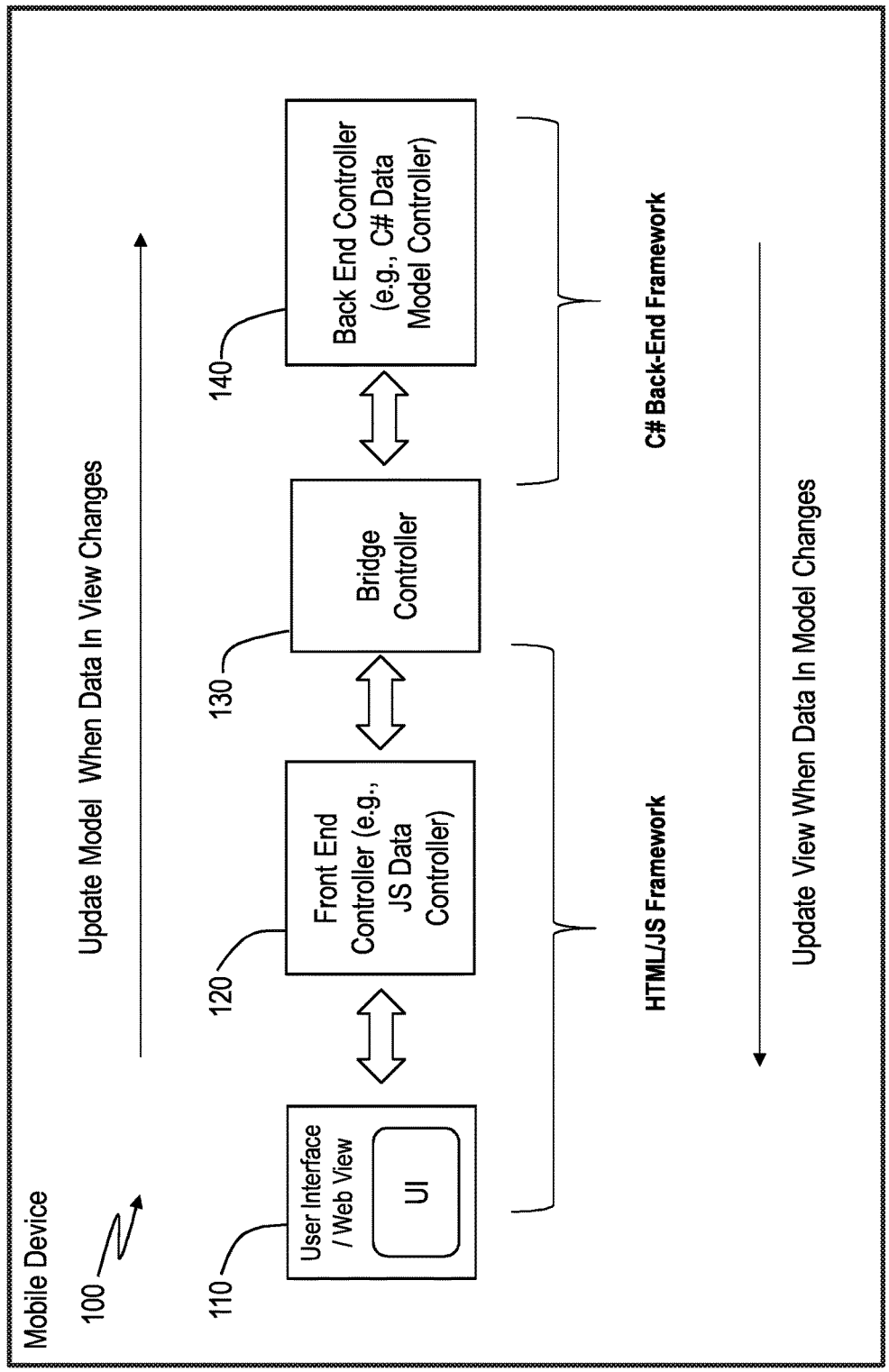
FIG. 1 illustrates a block diagram of an example computing environment implementing a binding bridge through a bridge controller to facilitate data binding across a multi-platform environment, in accordance with an example embodiment of the present disclosure.

FIG. 1 illustrates a block diagram of an example computing environment 100 implementing a binding bridge through a bridge controller to facilitate communication and data binding across a multi-platform environment, in accordance with an example embodiment of the present disclosure. As shown in FIG. 1, the computing environment 100 includes a user interface (UI) 110 (e.g., user interface or web view), a data controller 120 of a front-end binding framework of a front-end framework, a bridge controller 130, and a data model controller 140 of a back-end binding framework of a back-end framework. As previously discussed, the front-end framework can be a JS framework, and the back-end framework can be a C# framework. In this environment, front-end and back-end applications (or apps) can be developed and implemented on different frameworks, such as for architecture patterns where the view on an UI and the data model (which manages the data, rules and logic of an application) are managed on different platforms. One such pattern is MVVM, which further separates the data model into a view model (e.g., the logic and rules for a view) and a model which contains data for the application. The view model is an intermediary between the view and the model.

The data controller 120 interacts with the UI 110 to manage and update views on the UI 110, to receive updates when data in a view on the UI 110 has changed and to facilitate update of a data model (e.g., view model and model depending on the architectural pattern). In this example, the data controller 120 is a JS controller of a JS front-end framework, and manages JS data component for applications including a front-end app.

The data model controller 140 manages and updates data in the data model. For example, the data model controller 140 is configured to update the data in the data model, when data at the UI 110, which is associated with one or more bindable properties and/or methods, has changed. The data model controller 140 is also configured to facilitate update of a view in reply to a request (e.g., a request for a GET action) or when data associated with a bindable property or method changes in the data model. In this example, the data model controller is a C# controller of a C# back-end framework.

The bridge controller 130 is part of the binding bridge between the front-end framework and the back-end framework, and is configured to provide for two-way asynchronous communication between components of the front-end framework and the back-end framework, such as the data controller 120 and the data model controller 140. As will be described in greater detail below, the bridge controller 130 obtains post messages associated with each binding request from the front-end binding framework via an asynchronous call, parses the post message and communicates with the data model controller 140 to implement an action (e.g., GET or PUT) for the property and/or method binding of the binding request at the target object, e.g., the data model. After the action is taken at data model, the data model controller 140 sends a data model response with the relevant data to the bridge controller 130. The bridge controller 130 parses the response, and implements a callback for the corresponding request in the callback queue through the front-end binding framework. The call back invokes a callback function to send the response data (e.g., data from the data model for the bindable property or method) to the data controller 120 in reply the request. The data controller 120 then updates the view on the UI accordingly.

In this example, the computer environment can be a user device, such as a mobile device. The front-end binding framework with the data controller 120, the bridge controller 130, and the back-end binding framework with the data model controller 140 can be implemented on the user device.

The user device can include at least a processor(s) (e.g., CPUs), memory and network interface device(s) or NIDs to interact with other computers via one or more networks, input devices (e.g., touch screen/display, keyboard, buttons, audio input device, and/or other input devices), and output devices (e.g., display, audio output device and/or other output devices). The memory can store data and computer executable applications including an operating system, the two-way binding bridge and other applications or programs. The user device can be a mobile device (e.g., Android or iOS smartphone, tablet or device, laptop, etc.), a desktop computer, or other computer-implemented system.

When the user device executes, via its processor(s), applications stored in the memory, the processor and memory of the computer(s) provides for the frameworks, the binding and communication bridge, and the functions and features described herein, including asynchronous two-way communication between different frameworks (e.g., a communication layer for implementing asynchronous communication between different frameworks), and asynchronous two-way binding (e.g., data and/or method binding) for multi-platform applications which are implemented across different frameworks, e.g., a different front-end and back-end framework.

The above describes an example of the computer environment 100. The user device can interact with other computers (e.g., server(s) or the like) via a network(s) to implement applications and to update data maintained at a remote location including data in the data model, and so forth. The two-way binding processes and functions, including the various controller operations, may also be implemented across different computers, e.g., the user device may interact with other computer(s). The other computers may be connected across a network(s), and include at least a processor(s) (e.g., CPUs), memory, and NIDs to facilitate network communication across wire-line network, wireless network, Internet or a combination thereof. The memory may store data and computer executable applications including an operating system.

Figure 2:
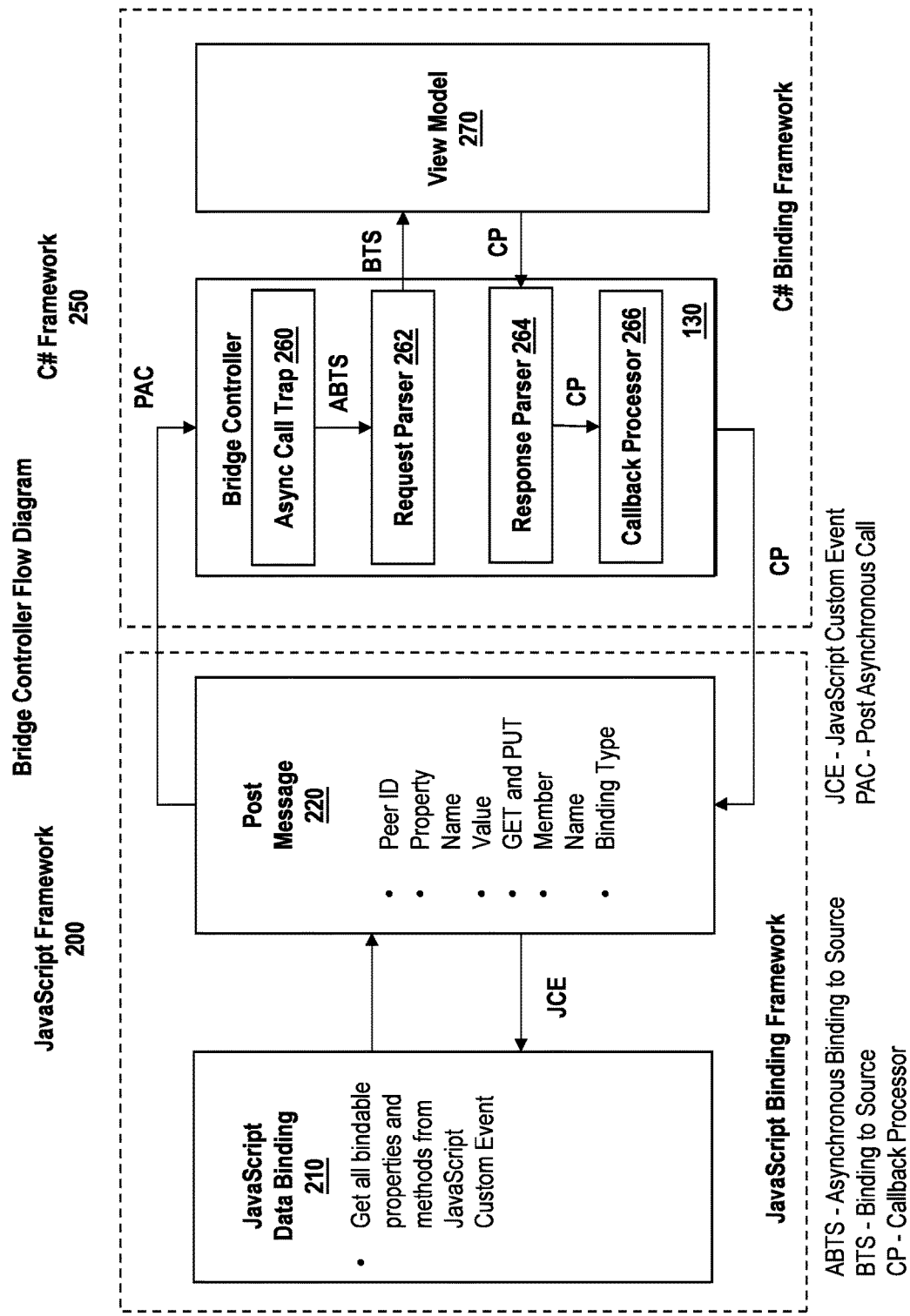
FIG. 2 illustrates a functional block diagram of an example bridge controller to facilitate data binding across a multi-platform environment, in accordance with an example embodiment of the present disclosure.

FIG. 2 illustrates a high-level functional block diagram of an example bridge controller and its functional components to facilitate data binding across a multi-platform environment. As shown in FIG. 2, the multi-platform environment includes a front-end framework 200 and a back-end framework 250. In this example, the front-end framework 200 includes a JS binding framework with a JS data controller or the like, and the back-end framework 250 includes a C# binding framework with a data model controller. The bridge controller 130 provides for a two-way communication layer between the front-end binding framework and the back-end binding framework to enable asynchronous two-way communication and binding therebetween.

In the front-end binding framework of the front-end framework 200, JS data binding 210 can get all bindable properties and/or methods from a JS custom event. The process may start, for example, when a binding request is initiated by the UI, such as when data in a view at the UI is changed or data for a view is requested. A post message 200 is eventually generated for the bindable properties and/or methods of the request, and can include parameters such as Peer ID, Property Name, Value, GET and PUT, Member Name and Binding Type. The post message 200 is then sent asynchronously as a post asynchronous call to the data model, in this case View Model 270 of the back-end framework 250 via the bridge controller 260 to update and/or request data from the data model.

Specifically, the bridge controller 130 implements an asynchronous call trap 260 to obtain the post message 220, and implements an asynchronous binding to source by initiating a Request Parser 262 to parse the post message. The bridge controller 130 then sends a request (also referred to as "a bridge request") based on the request data in the parsed post message to the data model controller of the back-end binding framework of the back-end framework 250. The data model controller can then take action accordingly to implement the requested actions for the bindable property and/or method on the data model, e.g., View Model 270. These actions can include updating and/or obtaining data from the View Model 270 for the bindable property or method. Once the data associated with the properties and/or methods are updated, accessed and/or retrieved on the View Model 270, call back processing is implemented in which a response (also referred to as "data model response") with the data or updated data from the View Model 270 sent to bridge controller 130. The bridge controller 130 obtains and parses the response data from the data model response with a Response Parser 264. A call back processor 266 then gets a callback when the response is returned for the request (e.g., the request with the same Peer ID), and automatically sends relevant response data from the view model 270 to the data controller using, for example, a JS custom event. The JS data binding 210 gets the JS custom event, and can then update the view at the UI in light of any changes at the data model (e.g., view model or model). Thus, two-way asynchronous binding of bindable properties and/or methods is provided between the UI and the data model (e.g., View Model 270) through the binding bridge implemented using the bridge controller 130 and its components. Accordingly, as changes take place to data in the view at the UI, the data model can be updated; as changes take place to data in the data model, the view can be updated at the UI.

Figure 3:
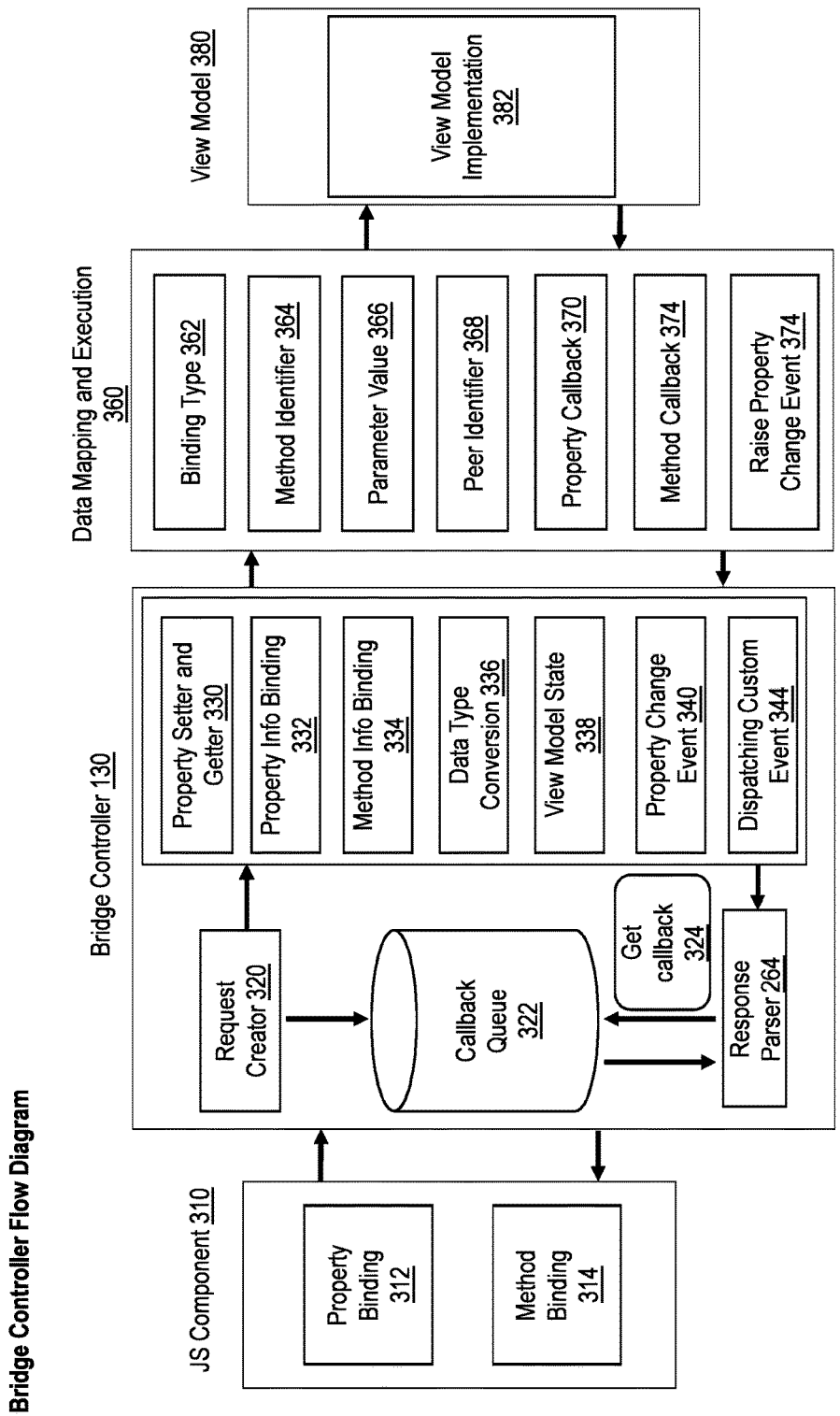
FIG. 3 illustrates a more detailed functional block diagram of an example bridge controller to facilitate data binding across a multi-platform environment, in accordance with an example embodiment of the present disclosure.

FIG. 3 illustrates a more detailed functional block diagram of an example binding bridge with the bridge controller 130 and its functional components to facilitate two-way asynchronous data binding across a multi-platform environment, such as a front-end framework and a back-end framework which are different. In this example, a front-end binding framework for the front-end framework includes a data component, such as JS Component 310, which is managed by a data controller to get and manage all bindable properties and methods on the front-end which interacts with the UI of a user device. A back-end binding framework of the back-end framework also includes components, which are managed by a data model controller. The components of the back-end framework include Data Mapping and Execution 360 and a data model such as a View Model 380 with View Model implementation 382. The bridge controller 130 facilitates asynchronous two-way communication, and thus binding, between the JS component 310 of the front-end binding framework and the Data Mapping and Execution 360 of the back-end binding framework.

The JS component 310, which is the data component of the JS binding framework, includes all of the bindable properties and methods, such as property binding 312 and method binding 314. The JS component 310 fetches properties and methods through the bridge controller 130 from the data model, e.g., View Model 380 (e.g., C# view model), and creates a binding with the view. The JS component 310 can include two parts: Property Binding and Method Binding. The Property Binding binds a value to a property of an element to modify its appearance or behavior; creates two-way data binding with view and model; includes properties such as Nullable, Bool, Number, String, String Array, Complex Type as JSON (JavaScript Object Notation) String, Item List Array, and Item List Array; binds property value with JS expression as well as input element/attribute; and supports asynchronous pattern of data binding. The Method Binding binds a method to a view model method; calls a method with or without parameters; and returns a value from the method; and supports asynchronous pattern of method binding.

The bridge controller 130 gets all bindable properties and methods from the data model, e.g., the C# view model, using callback events, and passes binding properties and methods to the data controller. The bridge controller 130 includes Request Creator 320 to create an object for a request, such as a binding request, received from the UI; Callback Queue 322 to hold request data; Response Parser 264 to parse a data model response from the View Model 380; and Get callback 324 to get a callback associated with the request data in the Callback Queue 322 in order to invoke a callback function.

The Request Creator 320 generates the JavaScript object which holds the protocol definition, such as for example:

// bindingtype: Common Method, View Model's Method, and View Model's Property
// verb: GET and PUT
// membername: Method Name
// value: Method Parameter or Function Name for View Model's Property
// memberparameter: Method Parameter's Value for Setter
// peerid: Peer Object Identifier The Callback Queue 322 holds all request data, which will send a post message asynchronously to the data model controller (e.g., C# controller) along with a call back function value. The Get callback 324 gets the callback when response data is received from the View Model 380 from a peer C# object.

The bridge controller 130 also includes Property Setter and Getter 330, Property Info Binding 332, Method Info Binding 334, Data Type Conversion 336, View Model State 338, Property Change Evener 340, and Dispatching Custom Event 344. The bridge controller 130 can implement these functions in response to a request, such as a binding request or other request relating to the data model.

The Data Mapping and Execution 360 holds all script message instances, which is used to generate property and method bindings through C# reflection. The Data Mapping and Execution 360 will contain same sets of property and method binding instance. The Data Mapping and Execution 360 includes: Binding Type 362, Method Identifier 364, Parameter Value 366, Peer Identifier 368, Property Callback 370, Method Callback 374, and Raise Property Change Event 374.

The View Model 380 holds all C# properties and methods implementation, which is hooked by directly from view.

Other descriptions of objects and object parameter are described below for a JS binding framework, and can be used to facilitate implementation of the binding bridge system and method described herein. In addition to the functions described above, the binding framework can also implement other functions: Subscribe To Property Changed, Unsubscribe To Property Changed, State Manager, Current View Model, State Changed, On Property Change, Create Binding Object, Data Type Conversion, and so forth. A description of these functional objects and some parameters are described below.

Peer Object Identifier—Holds the unique identifier of any C# object peer
DataTypes—Holds the supported data types in property binding dataTypes: {
 nullable: 0,
 bool: 1,
 string: 3,
 stringArray: 4,
 complexType: 5,
 complexTypeAsString: 6,
 complexTypeObjectArray: 7,
 itemListArray: 8
}

Binding Types—Supports both property and method binding types
Subscribe To Property Changed—Sets the JavaScript object as a subscriber for property change events
Unsubscribe To Property Changed—Removes the JavaScript object from property change subscription list
State Manager—Holds the view model state object
Current View Model—Gets the current view model identifier from the C# model
State Changed—Calls to view router to go to different state
On Property Change—Fires when property changes in the C# view model, and calls the property change callback on the JavaScript VM
Create Binding Object—Generates all binding properties and methods, holds the property and method information, gets and sets property values from the C# view model using the getter and setter functions, and bind the method information to C# method binding
Data Type Conversion—Converts basic data types of C# to JavaScript data types such as String, Number, and Boolean These functions and parameters for a JS front-end framework and C# back-end framework are provided as examples. The bridge binding system and method can be implemented using other identifiers, data types, binding types and object functions, and other naming conventions depending on the type of frameworks employed to implement multiplatform applications.

II. Example Processes

Figure 4:
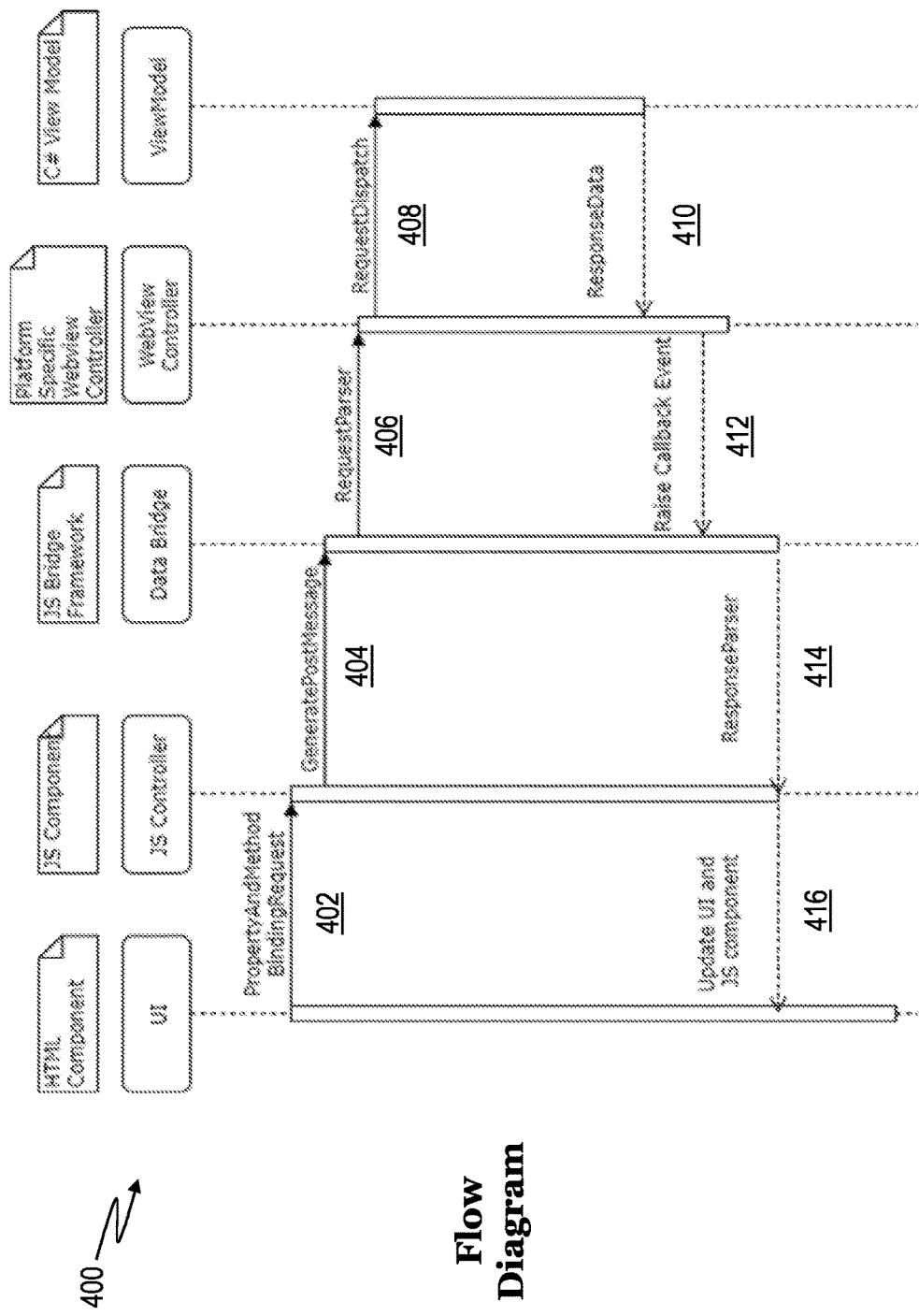
FIG. 4 illustrates a flow diagram of an example data binding process implemented across a multi-platform environment, in accordance with an example embodiment of the present disclosure.

FIG. 4 illustrates a flow diagram of an example data binding process 400 implemented across a multi-platform environment, in accordance with an example embodiment of the present disclosure. As shown in FIG. 4, at step 402, a property and/or method binding request (e.g., PropertyAndMethodBindingRequest) is initiated by the user interface (UI) of a user device. In this example, the request is an HTML request implemented through an HTML component of the UI in a front-end HTML/JS framework. The request may be initiated, for example, based on changes, selections or operations made through the UI by a user. The binding request can include an identifier of a source of the request (e.g., source object), the type of binding(s), its name and value(s) associated therewith, and any actions to be taken including updating data at or getting data from the target of the request (e.g., target object such as the data model). An example of protocol definitions and a format for an instance of a request is shown in FIGS. 5 and 7, which are described further below.

At reference 404, a data controller (e.g., JS controller) receives the binding request from the UI, and in response, generates a post message (e.g., GeneratePostMessage) in an asynchronous manner. For example, the data controller can create an object, e.g., JS request object, for the request data in the binding request, place the object in a queue such as a callback queue to maintain the request data, and subsequently generate a post message asynchronously for the request data in the queue. The bridge controller of the binding bridge traps the post message using, for example, a call trap, and parses the request data in the post message for communication to the data model controller (e.g., WebView Controller) via a bridge request at reference 406. At reference 408, the data model controller sends a RequestDispatch to the data model (e.g., ViewModel) to implement the requested action (e.g., GET or PUT, etc.) for a bindable property and/or method with respect to the data model. At reference 410, the data model sends response data (e.g., ResponseData) back to the data model controller, which in turn raises a callback event at the bridge controller at reference 412 and returns a data model response with the response data from the data model. At reference 414, the bridge controller implements a ResponseParser operation, which parses the data model response and gets the response data, and gets the callback from queue for the corresponding request (e.g., the peer request object in the queue). The callback automatically invokes a return operation by sending the response data to the data component (e.g., view component) of the data controller using, for example, a JavaScript custom event. At reference 416, the data controller updates the managed data component, e.g., the property and method bindings, and the view at the UI with the response data from the data model.

Although the example binding bridge process is described with JS-C# frameworks, it should be understood that the binding bridge can be user with other types of front-end and back-end frameworks and multi-platform apps.

III. Example Protocols and Formats

Examples of the parameters and format for a Request and Response protocols, which can be used in the computing environment of FIGS. 1-4 with the two-way binding bridge, are shown and described with reference to FIGS. 5 through 9.

FIG. 5 illustrates an example of Request Protocol 500 parameters and their definitions. In this example, the parameters can include a bindingType, verb, Member Name, value, memberparameter, and peerid. The bindingType defines the nature of the binding, such as a property binding and/or a method binding. The verb defines the actions to be taken, such as GET and PUT. The membername is the Method Name. The value is the Member Value. The memberparameter is the Method Parameter's Value for Setter. The peerid is Peer Object Identifier.

FIG. 6 illustrates an example of Response Protocol 600 parameters. In this example, the parameters can include id, membername, and value. The id is the Peer Object Identifier, and allows a response to be associated with a request (e.g., peer objects). The membername is Method Name. The value is the Member value.

FIG. 7 illustrates an example Request Format. As shown in FIG. 7, an example format 700 for a Request can include:
{
"bindingType": bindingType,
"verb": verb, "membername": membername,
"value": value,
"memberparameter": "memberparameter",
"peerid": peerid
}

FIG. 8 illustrates an example Response Format. As shown in FIG. 8, an example format 800 of a Response can include:
{
"id": id,
"membername": membername,
"value": value
}

FIG. 9 illustrates an example Supported Bindable Data Types. As shown in FIG. 9, the bindable data types 900 can include, for example, Nullable, Bool, Number, String, String Array, Complex Type as JSON String, and Item List Array.

The binding bridge, as described herein, can be configured for use with applications, such as mobile apps or other apps, on a user device. In this example, the binding bridge can provide for two-way data binding and On Property Changed Notification. Through the binding bridge, in a multi-platform app, any data related changes affecting the model can be immediately propagated to the matching view(s), and any changes made in the view(s), such as for example by the user, can be immediately reflected in the underlying model. When app data changes, the UI changes accordingly, and vice-a-versa. An example of a user interface, which provides pages (or screens), to allow a user to set up or configure an app for two-way binding on a computer device is shown with reference to FIGS. 10-12.

As shown in FIG. 10, an example page 1000, called Device, is provided with inputs, e.g., a text box and button controls, to set up property and method bindings on a device. By default, the Device Name can be set from the data model, and is reflected in the text box. Similarly, if the data is changed in the text box, it will be immediately reflected in the data model.

In this example, texts can be bound with controls using property bindings with different data types. An example for two-way binding is described below using AngularJS framework:
<div ng-app="app" ng-controller="MainCtrl">
<input ng-model="mymodel.data">
</div>

Although the example uses Angular JS framework, the data binding bridge is compatible with any JavaScript framework.

Method binding can subscribe with HTML button control, which can sense the event and propagate the action fired to the model. An example is provided below:
<div ng-app="app" ng-controller="MainCtrl">
<button ng-click="mymodel.Continue( )">
<h2 ng-bind="mymodel.data"></h2>
button>
</div>

In this example, ng-app, ng-controller, and ng-bind are angular directives; mymodel.data is the two-way binding data which is synchronized with the data binding bridge and the C# model; and mymodel.Continue( ) is the event binding, which is directly subscribed with the C# method binding.

FIG. 11 illustrates an example page 1100 called Sync Server can be provided to configure binding with one control, which also reflects in other control. The page 1100 can have a text box or other graphical input, and a Continue button or the like. Initially, the text box may have no data, and the Continue button is disabled. However, once data is entered in the text box, the Continue button can be enabled, and the data model can also be updated in the backend. In this example, the binding can work with multiple controls based on the set conditions.

FIG. 12 illustrates an example page 1200 showcasing multiple list controls which can also be provided. The data listed may be based on a dependent selected data and property changed events. The multiple list page 1200 can include graphical pull-down boxes or other input to enter (e.g., select choices, input text, etc.) relevant information, such as for example Base, User, Role and Password. When any data is selected, the other controls are enabled based on the selected data.

In this example, the mobile app can be used to enable workflow, data collection and general task management for plant operations, maintenance management, production tracking and compliance applications.

The above are provided simply as example protocols and formats. The Response and Request protocol and formats may include other parameters or use other naming conventions or syntax depending on the multi-platform environment including the type of framework(s).

It should be understood that devices, systems and methods described herein are provided as examples. The various devices, controllers, or systems, such as in the figures, can be implemented on one or more computer systems which include processor(s), memory, communication devices including network interface devices (NIDs) and other components to provide or control services and operations, including two-way communication and binding between different frameworks.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions of the script syntax for the various sections of a script file or script for a test scenario, directives, command-line switches, expressions, objects, attributes, thread names, file names, directory names and other naming conventions used herein are provided as examples, and can be given a different name or label.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices can include, but are not limited to, disks, solid state drives, optical disks, removable memory devices such as smart cards, SIMs, WIMs, semiconductor memories such as RAM, ROM, PROMS, etc. Transmitting mediums include, but are not limited to, transmissions via wireless communication networks (e.g., Radio Frequency (RF) communication, the Internet, intranets, telephone/modem-based network communication, hard-wired/cabled communication network, satellite communication, and other stationary or mobile network systems/communication links.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A computer-implemented method comprising:
   providing a front-end binding framework having a data controller that interacts with a user interface of a user device to manage a bindable property or method for a view on the user device;
   providing a back-end binding framework with a data model controller that manages a data model, the front-end binding framework and the back-end binding framework being different types of frameworks; and
   implementing, via a bridge controller, asynchronous two-way binding for the bindable property or method between the data controller of the front-end binding framework and the back-end binding framework to update the bindable property or method in the data model when data changes at the user interface and to update the view on the user device when data changes at the data model,
   wherein the providing a front-end binding framework operation, the providing a back-end framework operation and the implementing operation are performed on a user device;
   generating a request object corresponding to the data model for a binding request in the front-end binding framework; invoking a callback associated with the request object to update the view of the user interface with data from the corresponding model via a bridge response in response to the binding request.

2. The computer-implemented method of claim 1, wherein the front-end binding framework is a Javascript binding framework and the back-end binding framework is a C# binding framework.

3. The computer-implemented method of claim 1, further comprising:
   receiving at the front-end binding framework a binding request with request data for the binding property or method from the user interface,
   wherein the implementing comprises:
      obtaining asynchronously a post message corresponding to the binding request from the data controller, the post message including at least a peer identifier, a binding type and a verb associated with the binding request;
      parsing the post message; and
      dispatching a bridge request based on the parsed post message to the data model controller to perform an implementation on the data model according to at least the binding type and the verb.

4. The computer-implemented method of claim 3, further comprising:
generating a request object for the binding request in the front-end binding framework, the request object including at least a peer identifier, a binding type and a verb associated with the binding request;
placing the request object onto a callback queue in the front-end binding framework; and
generating the post message for the request object in the front-end binding framework.

5. The computer-implemented method of claim 3, wherein the implementing further comprises:
receiving a data model response from the data model in reply to the bridge request, the data model response including a peer identifier and a value associated with a binding property or method from the data model;
parsing the data model response at the bridge controller; and
sending a bridge response with data from the data model based on the parsed data model response to the front-end binding framework.

6. The computer-implemented method of claim 1, wherein the user device comprises a mobile device.

7. A computer-implemented method comprising:
providing a front-end binding framework having a data controller that interacts with a user interface of a user device to manage a bindable property or method for a view on the user device;
providing a back-end binding framework with a data model controller that manages a data model, the front-end binding framework and the back-end binding framework being different types of frameworks;
receiving at the front-end binding framework a binding request with request data for the binding property or method from the user interface;
generating a request object for the binding request in the front-end binding framework, the request object including at least a peer identifier, a binding type and a verb associated with the binding request;
placing the request object onto a callback queue in the front-end binding framework;
generating a post message for the request object in the front-end binding framework;
implementing, via a bridge controller, asynchronous two-way binding for the bindable property or method between the data controller of the front-end binding framework and the back-end binding framework to update the bindable property or method in the data model when data changes at the user interface and to update the view on the user device when data changes at the data model, wherein the implementing comprises:
obtaining asynchronously the post message corresponding to the binding request from the data controller, the post message including at least a peer identifier, a binding type and a verb associated with the binding request,
parsing the post message,
dispatching a bridge request based on the parsed post message to the data model controller to perform an implementation on the data model according to at least the binding type and the verb,
receiving a data model response from the data model in reply to the bridge request, the data model response including a peer identifier and a value associated with a binding property or method from the data model, and
parsing the data model response at the bridge controller;
accessing the callback queue to identify the request object corresponding to the data model response according to the peer identifier; and
invoking a callback function for the request object to update the view of the user interface via a bridge response with the data from the data model which is sent from the bridge controller to the front-end binding framework in response to the binding request.

8. A computer system for providing asynchronous two-way binding between a user interface of a user device and a data model which are implemented on different frameworks, the computer system comprising:
a memory; and
one or processors which implement:
a data controller to provide a front-end binding framework that interacts with a user interface of a user device to manage a bindable property or method for a view on the user device;
a data model controller to provide a back-end binding framework that manages a data model, the front-end binding framework and the back-end binding framework being different types of frameworks; and
a bridge controller to implement asynchronous two-way binding for the bindable property or method between the data controller of the front-end binding framework and the back-end binding framework to update the bindable property or method in the data model when data changes at the user interface and to update the view on the user device when data changes at the data model,
wherein the data controller, the data model controller and the bridge controller are implemented on a user device that includes the memory and the processor;
the data controller configured to generate a request object corresponding to the data model for a binding request in the front-end binding framework; the bridge controller configured to invoke a callback associated with the request object to update the view of the user interface with data from the corresponding model via a bridge response in response to the binding request.

9. The computer system of claim 8, wherein the front-end binding framework is a Javascript binding framework and the back-end binding framework is a C# binding framework.

10. The computer system of claim 8, wherein the data controller is configured to receive at the front-end binding framework a binding request with request data for the binding property or method from the user interface, and
wherein the bridge controller is further configured:
to obtain asynchronously a post message corresponding to the binding request from the data controller, the post message including at least a peer identifier, a binding type and a verb associated with the binding request; and
to parse the post message; and
to dispatch a bridge request based on the parsed post message to the data model controller to perform an implementation on the data model according to at least the binding type and the verb.

11. The computer system of claim 10, wherein the data controller is further configured:
to generate a request object for the binding request in the front-end binding framework, the request object including at least a peer identifier, a binding type and a verb associated with the binding request;

to place the request object onto a callback queue in the front-end binding framework; and to generate the post message for the request object in the front-end binding framework.

12. The computer system of claim 10, wherein the bridge controller is further configured:

to receive a data model response from the data model in reply to the bridge request, the data model response including a peer identifier and a value associated with a binding property or method from the data model;

to parse the data model response at the bridge controller; and to send a bridge response with data from the data model based on the parsed data model response to the front-end binding framework.

13. The computer system of claim 8, wherein the user device comprises a mobile device.

14. A computer system for providing asynchronous two-way binding between a user interface of a user device and a data model which are implemented on different frameworks, the computer system comprising:

a memory; and one or processors which implement:

a data controller to provide a front-end binding framework that interacts with a user interface of a user device to manage a bindable property or method for a view on the user device, the data controller being further configured:

to receive at the front-end binding framework a binding request with request data for the binding property or method from the user interface, to generate a request object for the binding request in the front-end binding framework, the request object including at least a peer identifier, a binding type and a verb associated with the binding request, to place the request object onto a callback queue in the front-end binding framework, and to generate a post message for the request object in the front-end binding framework;

a data model controller to provide a back-end binding framework that manages a data model, the front-end binding framework and the back-end binding framework being different types of frameworks; and a bridge controller to implement asynchronous two-way binding for the bindable property or method between the data controller of the front-end binding framework and the back-end binding framework to update the bindable property or method in the data model when data changes at the user interface and to update the view on the user device when data changes at the data model, the bridge controller being further configured:

to obtain asynchronously the post message corresponding to the binding request from the data controller, the post message including at least a peer identifier, a binding type and a verb associated with the binding request, to parse the post message, to dispatch a bridge request based on the parsed post message to the data model controller to perform an implementation on the data model according to at least the binding type and the verb, to receive a data model response from the data model in reply to the bridge request, the data model response including a peer identifier and a value associated with a binding property or method from the data model, to parse the data model response, to access the callback queue to identify the request object corresponding to the data model response according to the peer identifier, and to invoke a callback function for the request object to update the view of the user interface via a bridge response with the data from the data model which is sent from the bridge controller to the front-end binding framework in response to the binding request.

15. A tangible memory medium storing executable code which, when executed by one or more processors, implements a method of providing asynchronous two-way binding between a user interface and a data model which are implemented on different frameworks, the method comprising:

providing a front-end binding framework having a data controller that interacts with a user interface of a user device to manage a bindable property or method for a view on the user device;

providing a back-end binding framework with a data model controller that manages a data model, the front-end binding framework and the back-end binding framework being different types of frameworks; and implementing, via a bridge controller, asynchronous two-way binding for the bindable property or method between the data controller of the front-end binding framework and the back-end binding framework to update the bindable property or method in the data model when data changes at the user interface and to update the view on the user device when data changes at the data model, wherein the providing a front-end binding framework operation, the providing a back-end framework operation and the implementing operation are performed on a user device;

generating, by the data controller, a request object corresponding to the data model for a binding request in the front-end binding framework; invoking, by the bridge controller, a callback associated with the request object to update the view of the user interface with data from the corresponding model via a bridge response in response to the binding request.

16. The tangible memory medium of claim 15, wherein the front-end binding framework is a Javascript binding framework and the back-end binding framework is a C# binding framework.

17. The tangible memory medium of claim 15, wherein the method further comprises:

receiving at the front-end binding framework a binding request with request data for the binding property or method from the user interface, wherein the implementing comprises:

obtaining asynchronously a post message corresponding to the binding request from the data controller, the post message including at least a peer identifier, a binding type and a verb associated with the binding request;

parsing the post message; and dispatching a bridge request based on the parsed post message to the data model controller to perform an implementation on the data model according to at least the binding type and the verb.

18. The tangible memory medium of claim 17, wherein the method further comprises:

generating a request object for the binding request in the front-end binding framework, the request object including at least a peer identifier, a binding type and a verb associated with the binding request;
placing the request object onto a callback queue in the front-end binding framework; and
generating the post message for the request object in the front-end binding framework.

19. The tangible memory medium of claim 17, wherein the implementing further comprises:
receiving a data model response from the data model in reply to the bridge request, the data model response including a peer identifier and a value associated with a binding property or method from the data model;
parsing the data model response at the bridge controller; and
sending a bridge response with data from the data model based on the parsed data model response to the front-end binding framework.

20. A tangible memory medium storing executable code which, when executed by one or more processors, implements a method of providing asynchronous two-way binding between a user interface and a data model which are implemented on different frameworks, the method comprising:
providing a front-end binding framework having a data controller that interacts with a user interface of a user device to manage a bindable property or method for a view on the user device;
providing a back-end binding framework with a data model controller that manages a data model, the front-end binding framework and the back-end binding framework being different types of frameworks;
receiving at the front-end binding framework a binding request with request data for the binding property or method from the user interface;
generating a request object for the binding request in the front-end binding framework, the request object including at least a peer identifier, a binding type and a verb associated with the binding request;
placing the request object onto a callback queue in the front-end binding framework;
generating a post message for the request object in the front-end binding framework;
implementing, via a bridge controller, asynchronous two-way binding for the bindable property or method between the data controller of the front-end binding framework and the back-end binding framework to update the bindable property or method in the data model when data changes at the user interface and to update the view on the user device when data changes at the data model, wherein the implementing comprises:
obtaining asynchronously the post message corresponding to the binding request from the data controller, the post message including at least a peer identifier, a binding type and a verb associated with the binding request,
parsing the post message,
dispatching a bridge request based on the parsed post message to the data model controller to perform an implementation on the data model according to at least the binding type and the verb,
receiving a data model response from the data model in reply to the bridge request, the data model response including a peer identifier and a value associated with a binding property or method from the data model, and
parsing the data model response at the bridge controller;
accessing the callback queue to identify the request object corresponding to the data model response according to the peer identifier; and
invoking a callback function for the request object to update the view of the user interface via a bridge response with the data from the data model which is sent from the bridge controller to the front-end binding framework in response to the binding request.

* * * * *